US012668272B2

(12) United States Patent
Weston et al.

(10) Patent No.: US 12,668,272 B2
(45) Date of Patent: Jun. 30, 2026

(54) METHOD AND SYSTEM FOR ADAPTIVE NAVIGATION AND AUTONOMOUS DRIVING IN RESPONSE TO DETECTING A RESTRICTED OBJECT

(71) Applicant: Ford Global Technologies, LLC, Dearborn, MI (US)

(72) Inventors: Keith Weston, Canton, MI (US); John Robert Van Wiemeersch, Novi, MI (US); Stuart C. Salter, White Lake, MI (US); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 18/415,974

(22) Filed: Jan. 18, 2024

(65) Prior Publication Data

US 2025/0236311 A1      Jul. 24, 2025

(51) Int. Cl.
| | |
|---|---|
| *B60W 60/00* | (2020.01) |
| *B60W 50/14* | (2020.01) |
| *G01C 21/34* | (2006.01) |
| *G06V 20/59* | (2022.01) |
| *G06V 40/16* | (2022.01) |

(52) U.S. Cl.
CPC .......... *B60W 60/001* (2020.02); *B60W 50/14* (2013.01); *G01C 21/3415* (2013.01); *G01C 21/3461* (2013.01); *G06V 20/59* (2022.01); *G06V 40/172* (2022.01); *B60W 2420/403* (2013.01); *B60W 2540/043* (2020.02)

(58) Field of Classification Search
None
See application file for complete search history.

(56) References Cited

U.S. PATENT DOCUMENTS

| | | | |
|---|---|---|---|
| 6,862,524 B1* | 3/2005 | Nagda .............. | G08G 1/096816 |
| | | | 340/995.13 |
| 8,164,543 B2 | 4/2012 | Seder et al. | |
| 9,255,810 B2 | 2/2016 | Van Wiemeersch et al. | |
| 9,633,496 B2 | 4/2017 | Van Wiemeersch et al. | |
| 9,836,717 B2 | 12/2017 | Van Wiemeersch et al. | |
| 9,988,055 B1 | 6/2018 | O'Flaherty et al. | |
| 10,062,227 B2 | 8/2018 | Van Wiemeersch et al. | |
| 11,507,906 B2 | 11/2022 | Ahire | |

(Continued)

OTHER PUBLICATIONS

Matt E., "Concealed Carry Corner: Working Around Gun-Free Zones", The Firearm Blog, Jun. 3, 2021, pp. 1-10, https://www.thefirearmblog.com/blog/2021/06/03/concealed-carry-corner-working-around-gun-free-zones/.

*Primary Examiner* — Hongye Liang
(74) *Attorney, Agent, or Firm* — Joseph Zane; Brooks Kushman, P.C.

(57) ABSTRACT

A method includes defining an original travel route for an autonomous vehicle (AV) to a desired destination, detecting a restricted object in the AV based on an input signal employed to identify an object, defining a conditional route to the desired destination through one or more geographical areas permitting the restricted object using one or more route-object conditions in response to detecting the restricted object, and causing the AV to travel to the desired destination via the conditional route in response to detecting the object as the restricted object or via the original travel route in response to not detecting the object as the restricted object.

18 Claims, 3 Drawing Sheets

(56)        References Cited

U.S. PATENT DOCUMENTS

| | | | | |
|---|---|---|---|---|
| 2004/0225681 A1* | 11/2004 | Chaney | .................. | H04W 4/90 |
| 2011/0130945 A1* | 6/2011 | Deedy | .................. | G08G 1/207 |
| | | | | 701/112 |
| 2016/0364623 A1 | 12/2016 | Evans et al. | | |
| 2017/0174221 A1* | 6/2017 | Vaughn | ................ | G05D 1/0221 |
| 2017/0330044 A1 | 11/2017 | Telpaz et al. | | |
| 2018/0266834 A1* | 9/2018 | Cronin | ................ | B60W 50/082 |
| 2018/0297612 A1* | 10/2018 | Fukamachi | ............ | G06Q 50/40 |

* cited by examiner

METHOD AND SYSTEM FOR ADAPTIVE NAVIGATION AND AUTONOMOUS DRIVING IN RESPONSE TO DETECTING A RESTRICTED OBJECT

TECHNICAL FIELD

The present disclosure is generally directed to defining a travel route for an autonomous vehicle.

BACKGROUND

The statements in this section merely provide background information related to the present disclosure and may not constitute prior art.

An autonomous vehicle (AV) is generally configured to drive to a desired destination based on a travel route that may change based on various factor, such as but not limited to, traffic, additional intermittent stop, power efficiency, and/or travel preferences by the passenger (e.g., no toll roads, no freeway, etc.). While the AV may consider conditions that affect travel time and power efficiency, the AV may not consider other factors unrelated to the AV and/or traffic that can include whether the AV is permitted to travel through a geographical area.

SUMMARY

This section provides a general summary of the disclosure and is not a comprehensive disclosure of its full scope or all of its features.

In one form, the present disclosure is directed to a method that includes defining an original travel route for an autonomous vehicle (AV) to a desired destination, detecting a restricted object in the AV based on an input signal employed to identify an object, defining a conditional route to the desired destination through one or more geographical areas permitting the restricted object using one or more route-object conditions in response to detecting the restricted object, and causing the AV to travel to the desired destination via the conditional route in response to detecting the object as the restricted object or via the original travel route in response to not detecting the object as the restricted object.

In one form, the present disclosure is directed to a vehicle system including one or more processors, and a memory storing instructions executable by the one or more processors to cause the one or more processors: define an original travel route for an autonomous vehicle (AV) to a desired destination; detect a restricted object in the AV based on an input signal employed to identify an object; define a conditional route to the desired destination through one or more geographical areas permitting the restricted object using one or more route-object conditions in response to detecting the restricted object; and cause the AV to travel to the desired destination via the conditional route in response to detecting the object as the restricted object or via the original travel route in response to not detecting the object as the restricted object.

In one form, the present disclosure is directed to a method that includes defining an original travel route for an autonomous vehicle (AV) to a desired destination. The original travel route goes through one or more restricted geographical areas at which a restricted object is unauthorized. The method further includes providing a notification indicating that the original travel route for the AV travels through the one or more restricted geographical areas, and causing the AV to travel to the desired destination via the original travel route. The notification identifies the one or more restricted geographical areas and an object type of the restricted object.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A user of an autonomous vehicle (AV) may carry objects that may be prohibited or restricted in certain locations, and bring those objects into the AV. For example, firearms are prohibited in gun-free zones typically provided around schools and government facilities. A navigation system of the AV typically does not consider if the user has a prohibited/restricted object during a route planning operation, and a route defined to a desired destination may travel through an area prohibiting the restricted object.

The present disclosure is directed to a system for an AV configured to detect a restricted object in the AV based on an input signal employed to identify an object. Once the restricted object is detected, the system defines a conditional route to the desired destination through one or more geographical areas permitting the restricted object. Accordingly, the system of the present disclosure prevents or inhibits the AV from traveling through areas in which a restricted object within the AV is prohibited. This and other features are captured by the present disclosure.

Figure 1:
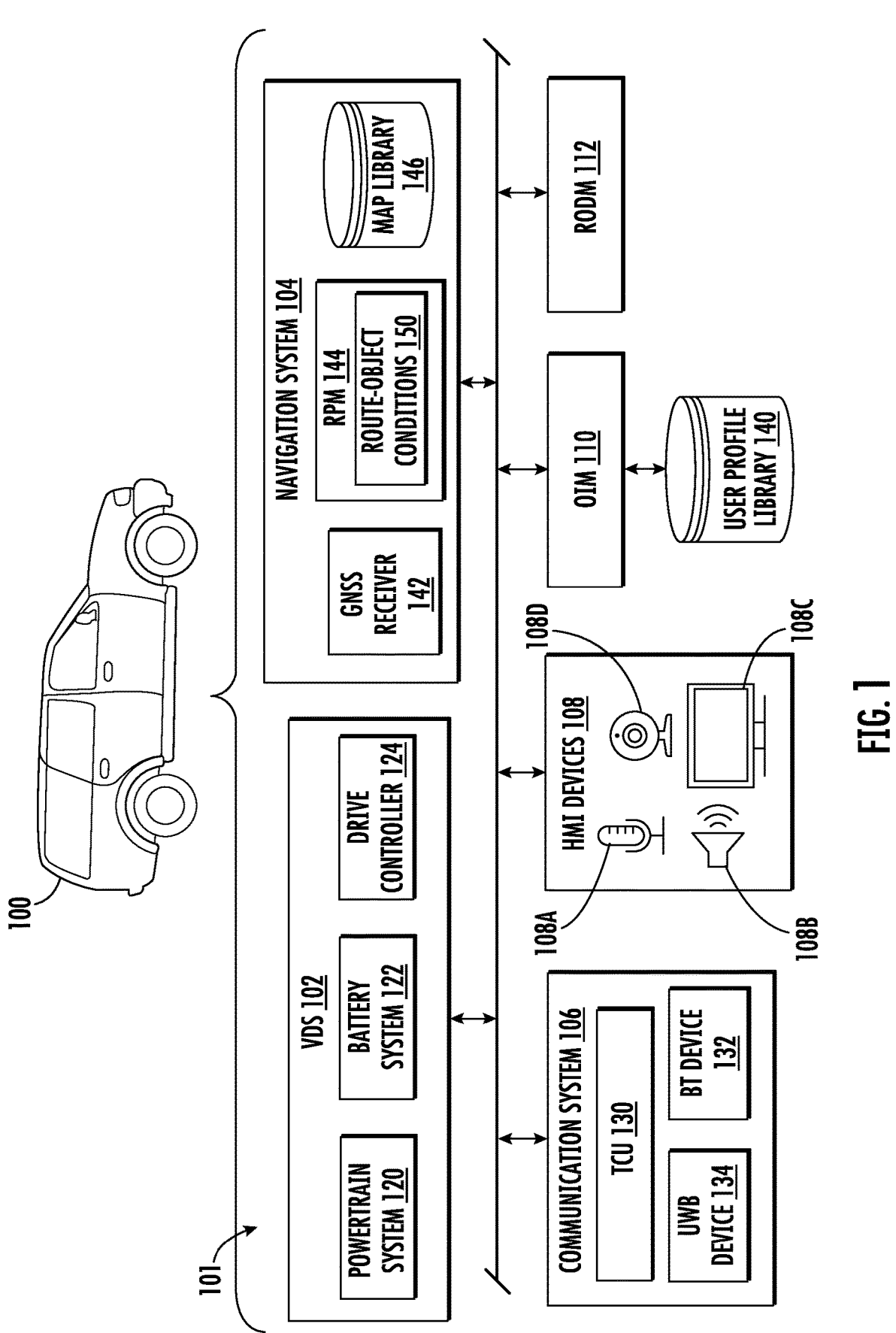
FIG. 1 illustrates an example autonomous vehicle (AV) having a restrictive object detection module in accordance with the present disclosure.

Referring to FIG. 1, an autonomous vehicle (AV) 100 is configured to define a route to a desired destination and then autonomously drive to the desired destination without input/ intervention from a human. In one form, a vehicle system 101 of the AV 100 includes a vehicle drive system (VDS) 102, a navigation system 104 configured to define a route to the desired destination, a communication system 106, one or more human machine interface devices (HMI) devices 108, an occupant identification module (OIM) 110, and a restrictive object detection module (RODM) 112 configured to detect restricted objects in the AV 100. In one form, the VDS 102, the navigation system 104, the communication system 106, the HMI devices 108, the OIM 110, and the object detector are in communication with each other via a vehicle network (e.g., a controlled access network CAN). While the AV 100 is illustrated as a passenger car, the present disclosure may be applicable to other types of AVs, such as but not limited to, a motorcycle, a bus, a truck, a boat, and/or an aerial vehicle (a drone, a plane, a helicopter).

The VDS 102 is configured to control drive operation of the AV 100, and among other components, includes a powertrain system 120, a battery system 122, and a drive controller 124. In one form, the powertrain system 120 includes one or more electric motors (not shown) to power movement of the AV 100. The battery system 122 includes a battery pack (not shown) for providing power to the powertrain system 120 to propel the AV 100. Using known techniques, the drive controller 124 is configured to control the powertrain system 120 by drawing power from the battery system 122 to cause the AV 100 to travel to the desired destination via the route defined.

In one form, the communication system 106 is configured to communicate with various external devices/systems using one or more wireless communication techniques. In a non-limiting example, the communication system 106 communicates with: a remote cloud-based server; objects having wireless communication capability, such as, but not limited to, a vehicle key fob, a firearm having a tracking feature; and portable computing devices (PCD) (e.g., a smartphone and/or tablet). Accordingly, among other components, the communication system 106 includes a telematics control unit (TCU) 130 that is configured to establish communication under vehicle-to-everything (V2X) protocol, a BLUETOOTH (BT) device 132 configured to communicate with other BT enabled devices/object using BT protocol, and/or one or more ultra-wideband (UWB) devices 134 provided at one or more locations of the AV 100 and configured to communicate with other UWB enabled devices/object using UWB protocol. The communication system 106 may also include a computing device/controller for processing messages received and transmitting messages using one or more wireless techniques.

The HMI devices 108 are operable to exchange information with the passenger by providing information to the passenger and/or receiving an input from the passenger. For example, the navigation system 104 may receive information related to the desired destination and provide the route using the HMI devices 108. In one form, the HMI devices 108 include, but is not limited to, audio devices (e.g., microphone 108A and/or speaker 108B), display device 108C (e.g., a head-up display and/or a liquid crystal display with touchscreen), a camera 108D and/or other suitable interface devices (e.g., buttons, knobs, etc.).

The OIM 110 is configured to detect and identify passenger(s) within the AV 100 using user profile records provided in a user profile library 140. More particularly, a user may create a profile employed by the AV 100 to customize features of the AV 100 for the user. In a non-limiting example, the user may create the profile through graphical user interfaces provided by the OIM 110 via the HMI devices 108, and/or a web-based interface associated with the AV 100. Information provided in the user profile record may be provided by the user and/or learned by different modules in the AV 100 (e.g., navigation system 104 stores information related to destinations that the user travels to using the AV 100). In a non-limiting example, the user profile record includes information indicating: a user identification (e.g., name); image data (e.g., facial features) employed to identify the user when the user is a passenger in the AV 100; information regarding a PCD associated with the passenger (e.g., cell phone make/model, unique alphanumeric identification); a vehicle key fob identification associated with the user for accessing the vehicle; a phone-as-key identification associated with the user; and information regarding a restricted object to be associated with the user. Information related to the restricted object may include, but is not limited to, an object type (e.g., firearm, weapons, regulated or legalized medicine/drug), a unique identification associated with the object if available (e.g., registration number of a firearm), and/or documentation authorizing use of the restricted object (e.g., a firearm permit, prescriptions, and/or name of the passenger if the passenger is not an identified by the OIM 110).

In one form, the OIM 110 is configured in various suitable ways to detect and then identify the passenger. For example, the OIM 110 is configured to receive image data from the camera, which captures images of a passenger cabin of the AV, and using known image processing techniques determines whether a passenger/occupant is inside the AV 100. In addition, using facial feature data stored in the user profile library 140 for various registered users, the OIM 110 is configured to identify each detected passenger. If the facial feature data does coincide with those provided in the user profile library 140, the passenger is not identified, and the OIM 110 may present options for setting up a user profile record.

In another variation, the OIM 110 is configured to detect a passenger based on devices in communication with the communication system 106. For example, when a PCD that is paired with the communication system 106 enters the AV, the communication system 106 recognizes the portable communication device, and the OIM 110 is configured to determine if the identification of the PCD is provided in a user profile record. If so, the OIM 110 is configured to assume that the user associated with the PCD is in the AV 100. A similar analysis may be performed for vehicle key fobs and phone-as-key software application on a PCD.

While specific examples are provided, the OIM 110 is configured to detect and identify passengers in other ways. For example, pressure sensors in seats of the AV 100 may be used to detect a passenger and the detected passenger is prompted to provide an identification (e.g., a name) in response to an inquiry from the OIM 110.

In one form, the RODM 112 is configured to detect restricted objects in the AV 100 based on an input signal employed to identify an object and, if detected, provide information to the navigation system 104. The RODM 112 is configured to detect the restricted object employing various techniques including the following techniques, which may be used separately or in combination with each other.

In one form, the RODM 112 employs a predefined restricted object list that are generally considered restricted depending on location of the AV and/or a passenger (e.g., firearms, recreation drugs, prescribed narcotics.). The RODM 112 is configured to first detect an object and then determine if the object is a restricted object using, for example, the predefined restricted object. In a non-limiting object, the RODM 112 may detect the object based on a wireless signal being emitted by the object (e.g., a radio signal). That is, the restricted object may be equipped with a tracking device that emits a wireless signal that provides identification information which may indicate an object type. The tracking device provided may include low power signal transmitter detectable using BT protocol, UWB protocol, among other suitable protocols that are detectable by the communication system 106. The RODM 112 is configured to receive identification information related to the restricted object from the communication system 106, which detects and processes the wireless signal from the object. The tracking device may be provided as a separate component that is fastened to the restricted object and/or may be embedded in the restricted object. Using the identification information and the predefine restricted object list, the RODM 112 may identify the detected object as being a restricted object. In this example, the wireless signal from the tracking device is associated as an input signal to identify the object.

In another form, the user profile record may indicate whether the user identified in the record is associated with a restricted object. More particularly, the RODM 112 is configured to obtain the user profile record for the identified passenger to determine whether the passenger is associated with a restricted object. In some variations, if the user profile record indicates that the passenger is associated with a restricted object, the RODM 112 is configured to provide an inquiry to the passenger via the HMI devices 108 confirming whether the restricted object is in the AV 100. Alternatively, the RODM 112 is configured to assume that the restricted object is in the AV 100 based on the information in the user profile record. As detailed above, the OIM 110 is configured to identify the passenger using various techniques, including but not limited to facial features, key fob information, PCD identification, and/or phone-as-key software application. Accordingly, the input signal may be provided as a signal from the camera 108D providing image data to identify the passenger, a key fob associated with the detected passenger, and/or a signal from the PCD associated with the identified passenger.

In one form, a passenger of the AV 100 may voluntarily input information related to a restricted object via the HMI devices 108, which is provided to the RODM 112. In a non-limiting example, the RODM 112 provides one or more graphical user interfaces operable by the passenger to provide information related to the restricted object in the AV 100 via the HMI devices 108. Through the graphical user interfaces, information related to the restricted object may include, but is not limited to, an object type (e.g., firearm, weapons, regulated or legalized medicine/drug), a unique identification associated with the object if available (e.g., registration number of a firearm), documentation authorizing use of restricted object (e.g., a firearm permit, prescriptions, and/or name of the passenger if the passenger is not an identified by the OIM 110). In this example, the input provided by the passenger via the HMI devices 108 is provided as the input signal to identify the object.

By defining a restricted object, the passenger is able to define objects that may generally not be considered prohibited as restrictive. For example, objects such as a cash bag, an insulin pump, and/or baby diaper bags may be identified as restricted to the passenger. Accordingly, if the diaper bag is left in the AV 100 when the passenger has left, the AV 100 may perform an action, as detailed below, to have the bag delivered to the passenger.

In some variations, once detected, the RODM 112 is further configured to determine whether the restricted object is still in the AV 100 once the desired destination is reached. For example, the restricted object may still be emitting a wireless signal via the tracking device and/or the passenger identified by the occupant and associated with the restricted object is still in the AV 100. If the restricted object is still in the AV 100, the navigation system 104 continues to plan a route using travel conditions associated with the restricted object. If the passenger associated with the restricted object is no longer in the AV 100, which is detected by the OIM 110, the RODM 112 is configured to provide a notification indicating the object detected as the restricted object is in the AV 100. Conversely, if the restricted object is no longer in the AV 100, but should be in AV, the RODM 112 is configured to issue a notification indicating that the restricted object is not detected and should be returned. In a non-limiting example, if the passenger associated with the restricted object is still in the AV 100, but the restricted object is no longer detected (e.g., no wireless signal is received from the restricted object), the RODM 112 may determine that the restricted object was mistakenly taken out and thus, issue a notification. In one form, the RODM 112 may issue a notification via the HMI devices 108, or transmit a message to a PCD associated with the passenger (e.g., passenger associated with the restricted object, passenger that may have left, and/or passenger still in the vehicle), and/or notify proper authorities via V2X communication.

In one form, the navigation system 104 is configured to track a location of the AV 100 and define a route based on the desired destination to have the VDS 102 control the AV 100 to travel to the desired destination via the route. In some variations, the navigation system 104 is supported by the PCD provided in the AV 100, in lieu of or in addition to a separate dedicated navigation system 104 installed within the AV 100. Specifically, the PCD is configured to include one or more route guidance software applications that the passenger may employ to go to a desired destination. With the PCD in communication with the AV 100 via the communication system 106, various modules/systems may access information related to the guidance software, such as, but not limited to the HMI devices 108. Accordingly, the navigation system 104 may be supported and implemented by the PCD.

Among other components, the navigation system 104 includes a GNSS receiver 142 for detecting a position/location of the AV, a route planning module (RPM) 144 configured to define the route and monitor the travel of the AV, and a map library 146 configured to store map data employed by the RPM 144 in defining a route.

In a non-limiting example, the RPM 144 may define one or more perspective routes to the desired destination, and selects a route to be taken by the AV 100 from among the perspective routes. The perspective routes to the desired location may be defined using various algorithms that may consider various factors, such as but not limited to, traffic, road closures, fuel efficiency, and/or travel time. For example, referring to FIG. 2, the AV 100 is traveling to a desired destination 200, and the RPM 144 defines perspective routes 204 and 206 to the desired destination 200.

In one form, the RPM 144 is configured to further consider whether the AV 100 is permitted to travel through geographical areas that the perspective routes are defined through. Specifically, some geographical areas prohibit or restrict certain objects from being within the area. In a non-limiting example, restricted objects such as firearms and/or other weapons are prohibited in schools, government buildings, and/or parks. In some cases, the restricted object is not only prohibited in the building but also within an identified distance around the building. For example, in FIG. 2, a school 208 and government building 210 provide are considered areas where weapons are not permitted and define a weapon free zone 212 and 214, respectively. Accordingly, a restricted geographical area may include, but is not limited to, a building or an area including the building and a region around the building at which the restricted object is unauthorized/prohibited.

In one form, the RPM 144 employs a route-object conditions 150 that correlates types of restricted objects with associated geographical areas the object is restricted from and an associated navigation action for the RPM 144 to perform when the restricted object is detected in the AV 100. The type of restricted object (i.e., restricted object type) may include, but is not limited to: weapons (e.g., firearms, knives, explosives); prescribed medications that are only to be carried by the patient (e.g., Class 1 narcotics); and recreational drugs that may be legal in some jurisdiction and illegal in others (e.g., cannabis). In a non-limiting example, the route-object conditions 150 may be provided as an algorithm, a series of software code, and/or a look-up table.

Each restricted object type is associated with geographical locations that may not permit the object. In a non-limiting example, the weapons are restricted from schools, government buildings, and/or airports; for recreational drugs, the geographical locations may include names of states the recreation drug is prohibited; and/or for prescribed medications the geographical location may include all locations if the passenger is not the prescribed user of the medications. Accordingly, in one form, using maps provided in the map library 146 and the route-object conditions 150, the RPM 144 is configured to define perspective travel route to a desired destination and identifies geographical locations along the route that may not permit and/or have restrictions on an identified object.

In one form, the one or more navigation action for a restrictive object may include, but is not limited to: defining a route to the desired destination so as to bypass geographical area in which the restricted object is prohibited; define a route to a home location, as a new desired destination, in that event that restricted object is prohibited at the designated location and/or the passenger is not permitted to have the restricted object.

For example, if the restricted object is a weapon, the route-object conditions 150 may indicate that geographical areas having a school, government buildings, and/or other building prohibiting firearms are to be avoided as part of the route planning process. In some variation, the route-object conditions 150 may associate restricted object with cities, states, and/or countries that the restricted object is not permitted. For example, the restricted object may be a drug, like cannabis, which is legal in some states, but illegal in other states. So, the route-object conditions 150 may indicate which states and/or countries cannabis should not travel through. In some variations, the route-object conditions 150 may also include information related to how an identified restricted object is to be transported in the AV 100. For example, if a firearm is being transported, the firearm may need to be unloaded (i.e., no ammunition in firearm), housed in a case, and/or positioned outside of the reach of the passenger (e.g., in the trunk of the AV 100).

In addition, the route-object conditions 150 define one or more navigational actions for a restricted object, where the action may include, but is not limited to: defining a conditional route to the desired destination through one or more geographical areas permitting the restricted object; selecting another destination as the desired destination; and/or providing, via the HMI devices 108, information on how to transport the restricted object based on the requirements of geographical regions the AV 100 is going to travel through (e.g., firearm is to be placed in a case and away from the passengers).

Figure 2:
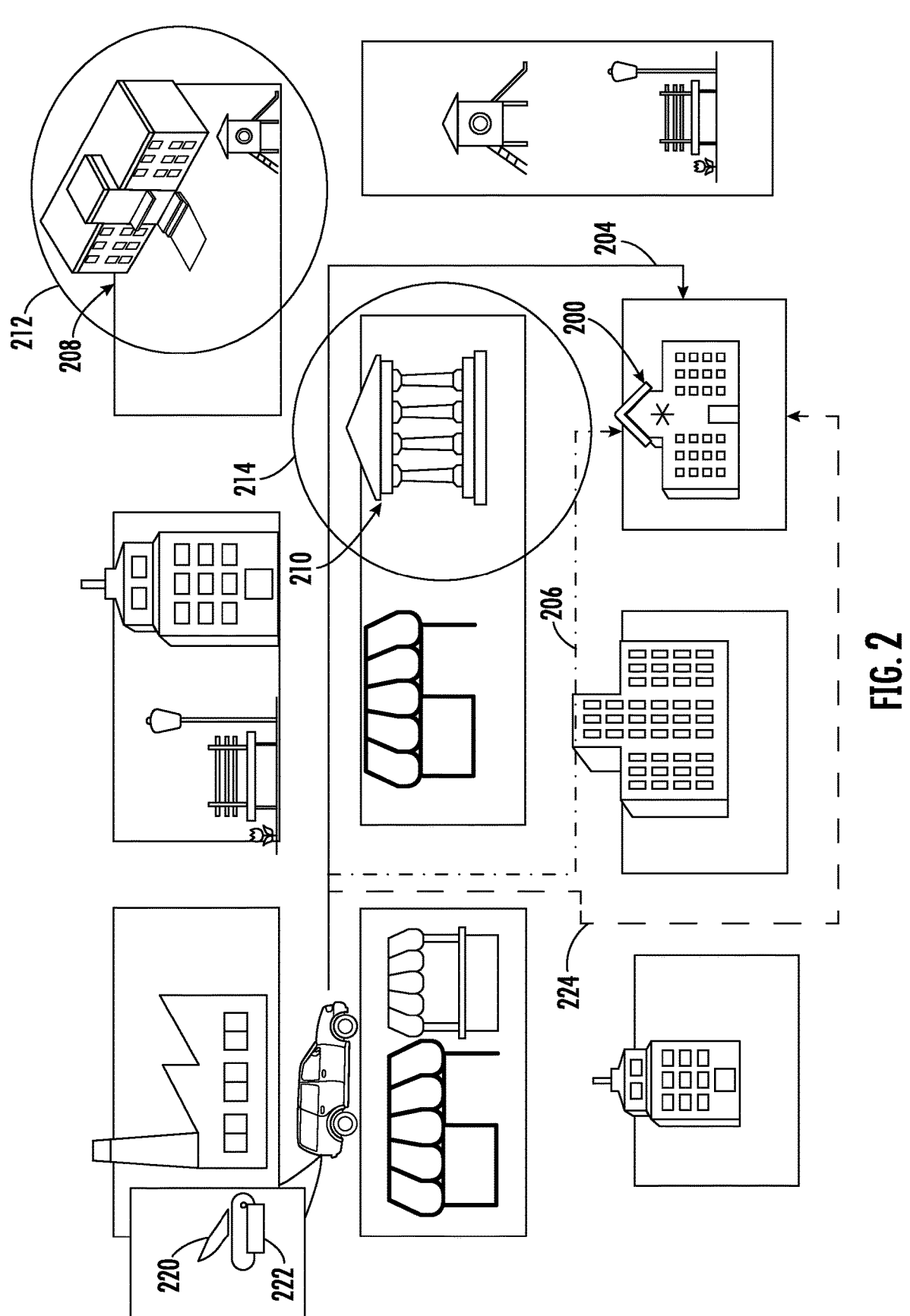
FIG. 2 illustrates an example routing of the AV due to a detected restrictive object in accordance with the present disclosure.

In a non-limiting example, referring to FIG. 2, the AV 100 includes a weapon 220 having a tracking device 222 detected by the communication system 106. Using the route-object conditions 150, the RPM 144 determines a conditional route 224 that does not travel through areas 212, 214 to reach the desired destination 200. Accordingly, the RPM 144 is configured to define a route to a desired destination, and when a restricted object is detected, the RPM 144 is configured to perform a navigation action in accordance with the route-object conditions 150. It is not required that the conditional route be a new route. A conditional route may also be a perspective route originally defined prior to the restricted object being detected as long as the route does not include geographical areas prohibiting the restricted object.

In addition to the navigational action, the route-object conditions 150, may also provide other actions, such as providing a notification provided via the HMI devices 108, and/or the PCD associated with the passenger and provided by the communication system 106 when the navigation of the AV 100 is changed due to the restricted object.

In some variations, if the user profile record indicates that the passenger is associated with a restricted object, but the passenger indicates that the restricted object is not in the AV 100 and/or the restricted object is not detected independently from an action by the passenger (e.g., no wireless signal from the object), the RODM 112 may indicate that the passenger is generally associated with a restricted object and provides an object type of the restricted object to the navigations system 104. Using the route-object conditions 150 and the map library 146, the RPM 144 is configured to provide a notification to the passenger when the AV 100 is to and/or is traveling through a geographical region having restrictions related to the restricted object generally associated with the passenger.

In some variations, if no restricted object is detected and/or the user profile does not indicate a restricted object associated with the passenger, the RPM 144 is configured to provide notification of a restriction provided with a selected geographical area when the travel route of the AV 100 is to travel through the selected geographical area. Accordingly, the passengers are notified of restrictive geographical areas even without a detected restricted object and/or being associated with a restricted object.

In some variations, in addition to or in lieu of the route-conditions 150 identifying geographical regions having restrictions, a cloud-based server in communication with the AV 100 may store information related to various geographical regions. For example, the information stored may identify restrictions associated with the geographical region, requirements/standards for transporting the restricted object, and/or recommended actions when traveling through the region.

Figure 3:
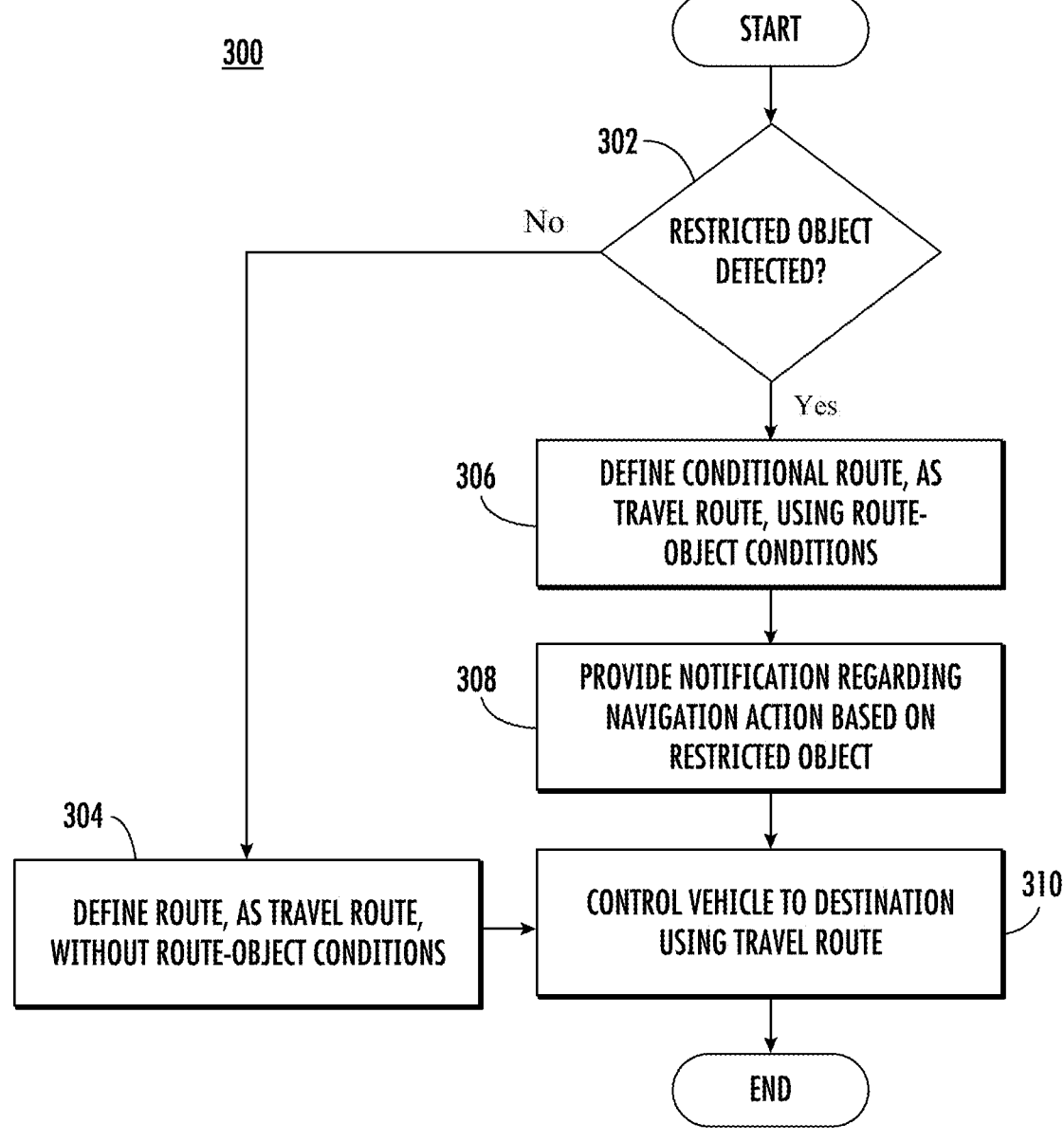
FIG. 3 is a flowchart of an example navigation routine in accordance with the present disclosure.

Referring to FIG. 3, an example navigation routine 300 performed by the AV of the present disclosure is provided. At operation 302, the AV 100 determines if a restricted object is detected as described in detail above. If a restricted object is not detected, the AV 100 defines a route, as a travel route, without using the route-object conditions 150, at operation 304. If a restricted object is detected, the AV 100 defines a conditional route using route-object conditions 150, at 306. At operation 308, the AV 100 provides a notification regarding the navigation action based on the restricted object, so as to notify the passenger of the restricted object a possible modification in navigation of the AV 100. At 310, the AV 100 is controlled to destination using travel route defined at either operation 304 or 306.

The navigation routine 300 may be configured to perform other operations within the scope of the present disclosure, and should not be limited to the example described herein. For example, the navigation routine may define an original route and determine if the original route travels through one or more restricted geographical areas at which a restricted object is unauthorized. If so, a notification indicating that the original route for the AV travels through the one or more restricted geographical areas is provided. The notification may identify the one or more restricted geographical areas and an object type of the restricted object. In this variation, the restricted object may not have been detected, but the navigation routine 300 notifies the passenger(s) of possible restrictions along the travel route. With no detected restricted object, the AV is controlled to travel to the desired destination via the original travel route.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method, comprising:
defining an original travel route for an autonomous vehicle (AV) to a desired destination;
obtaining a user profile record associated with a passenger in response to the passenger being identified based on an input signal employed to identify an object;
detecting the object as a restricted object in the AV in response to the user profile record indicating that the passenger is associated with the restricted object;
defining a conditional route to the desired destination through one or more geographical areas permitting the restricted object using one or more route-object conditions in response to detecting the restricted object; and
causing the AV to travel to the desired destination via the conditional route in response to detecting the object as the restricted object or via the original travel route in response to the object not being the restricted object.

2. The method of claim 1, wherein the input signal is a radio signal from the object providing data employed to identify a type of the object.

3. The method of claim 1, wherein the input signal is from a vehicle key associated with the passenger.

4. The method of claim 1, wherein the input signal includes image data of at least one image of a passenger cabin, wherein the passenger is identified based on the image data.

5. The method of claim 1, wherein the original travel route goes through one or more restricted geographical areas at which the restricted object is unauthorized.

6. The method of claim 1, further comprising providing a notification regarding changing a travel route of the AV from the original travel route to the conditional route after detecting the object as the restricted object.

7. The method of claim 1, further comprising, after reaching the desired destination,
detecting the restricted object in the AV based on a second input signal employed to identify the object; and
providing a notification indicating the object detected as the restricted object is in the AV in response to a passenger leaving the AV.

8. A vehicle system, comprising:
one or more processors;
a memory storing instructions executable by the one or more processors to cause the one or more processors:
define an original travel route for an autonomous vehicle (AV) to a desired destination;
obtain a user profile record associated with a passenger in response to the passenger being identified based on an input signal employed to identify an object;
detect the object as a restricted object in the AV in response to the user profile record indicating that the passenger is associated with the restricted object;
define a conditional route to the desired destination through one or more geographical areas permitting the restricted object using one or more route-object conditions in response to detecting the restricted object; and
cause the AV to travel to the desired destination via the conditional route in response to detecting the object as the restricted object or via the original travel route in response to the object not being the restricted object.

9. The vehicle system of claim 8, wherein the input signal is a radio signal from the object providing data employed to identify a type of the object.

10. The vehicle system of claim 8, wherein the input signal is from a vehicle key associated with the passenger.

11. The vehicle system of claim 8, wherein the input signal includes image data of at least one image of a passenger cabin, wherein the passenger is identified based on the image data.

12. The vehicle system of claim 8, wherein the original travel route goes through one or more restricted geographical areas at which the restricted object is unauthorized, and the instructions further cause the one or more processors to provide a notification regarding changing a travel route of the AV from the original travel route to the conditional route after detecting the object as the restricted object.

13. The vehicle system of claim 8, wherein the instructions further cause the one or more processors to detect the restricted object in the AV based on a second input signal employed to identify the object; and provide a notification indicating the object detected as the restricted object is in the AV in response to a passenger leaving the AV.

14. A method, comprising:

defining an original travel route for an autonomous vehicle (AV) to a desired destination, wherein the original travel route goes through one or more restricted geographical areas at which a restricted object is unauthorized;

obtaining a user profile record associated with a passenger in response to the passenger being identified based on an input signal employed to identify an object;

detecting the object as the restricted object in the AV in response to the user profile record indicating that the passenger is associated with the restricted object;

defining a conditional route to the desired destination through one or more geographical areas permitting the restricted object using one or more route-object conditions in response to detecting the restricted object;

providing a notification indicating that the original travel route for the AV travels through the one or more restricted geographical areas, wherein the notification identifies the one or more restricted geographical areas and the restricted object;

providing a second notification regarding changing a travel route of the AV from the original travel route to the conditional route after detecting the object as the restricted object; and causing the AV to travel to the desired destination via the original travel route, or via the conditional route in lieu of the original travel route in response to detecting the object as the restricted object.

15. The method of claim 14, wherein the notification includes instructions for transporting the restricted object through the one or more geographical areas.

16. The method of claim 14, wherein the input signal is a radio signal from the object providing data employed to identify a type of the object.

17. The method of claim 14, wherein the input signal is from a vehicle key associated with the passenger.

18. The method of claim 14, wherein the input signal includes image data of at least one image of a passenger cabin, wherein the passenger is identified based on the image data.

* * * * *